United States Patent
Chauquet et al.

(10) Patent No.: US 7,488,417 B2
(45) Date of Patent: Feb. 10, 2009

(54) AQUARIUM FILTER ASSEMBLY

(75) Inventors: Jacques Jean Chauquet, Ayze (FR);
Yves André René Grosse, Mûres (FR);
Gary Lee Jones, Ottsville, PA (US);
Joel Martin Goldstein, Lower Gywnedd, PA (US)

(73) Assignee: Mars Fishcare North America, Inc., Chalfont, PA (US)

( * ) Notice: Subject to any disclaimer, the term of this patent is extended or adjusted under 35 U.S.C. 154(b) by 400 days.

(21) Appl. No.: 11/230,752

(22) Filed: Sep. 20, 2005

(65) Prior Publication Data
US 2006/0060514 A1 Mar. 23, 2006

Related U.S. Application Data

(60) Provisional application No. 60/611,649, filed on Sep. 20, 2004.

(51) Int. Cl.
*A01K 63/04* (2006.01)
*C02F 1/32* (2006.01)
*B01D 27/00* (2006.01)

(52) U.S. Cl. ............... 210/167.22; 210/167.25; 210/167.27; 210/238; 210/282; 210/416.2; 210/748; 119/260

(58) Field of Classification Search ............ 210/167.21, 210/167.22, 167.25, 167.27, 232, 238, 263, 210/416.1, 416.2, 905, 908, 282, 748; 119/259, 119/260
See application file for complete search history.

(56) References Cited

U.S. PATENT DOCUMENTS 3,258,900 A * 7/1966 Harms .................. 55/485
3,746,168 A 7/1973 Willinger et al.
3,861,565 A 1/1975 Rickmeier, Jr.

(Continued)

FOREIGN PATENT DOCUMENTS

EP 0341356 A1 11/1989

(Continued)

OTHER PUBLICATIONS

Product Sheet—The Marineland Aqua-Reminder™ Programmable Aquarium Service Alert, 2002.

(Continued)

*Primary Examiner*—Fred Prince
(74) *Attorney, Agent, or Firm*—Panitch Schwarze Belisario & Nadel LLP

(57) ABSTRACT

An aquarium filter assembly includes a filter assembly body, a water supply section and a filtered water section, the aquarium filter assembly being adapted for liquid connection with an aquarium, a removable filter cartridge caddy within the filter assembly body, a base with an outer peripheral wall extending upwardly from the base and an inner peripheral wall extending upwardly from the base surrounding an opening in the base, a support for a filter cartridge, a lift handle, a removable cover connectable to an upper portion of the support; a multi-paneled filter cartridge of filter material with a space between the panels removably supportable on the support; and a water supply assembly to supply water from the aquarium to the filtered water section, such that water flows from the water supply section through the filter cartridge supported by the caddy, into the filtered water section of the filter assembly body and then into the aquarium.

48 Claims, 14 Drawing Sheets

U.S. PATENT DOCUMENTS

| | | | | |
|---|---|---|---|---|
| 4,047,914 | A | * | 9/1977 | Hansen et al. .............. 55/488 |
| 4,220,530 | A | | 9/1980 | Gabriele |
| 4,285,813 | A | | 8/1981 | Stewart et al. |
| 4,714,547 | A | * | 12/1987 | Willinger ............ 210/167.22 |
| 4,895,648 | A | | 1/1990 | Hankammer |
| 4,986,901 | A | | 1/1991 | Nohren, Jr. et al. |
| 5,026,477 | A | | 6/1991 | Yen |
| 5,045,192 | A | * | 9/1991 | Terhune .................... 210/232 |
| 5,062,950 | A | | 11/1991 | Shieh |
| 5,190,643 | A | | 3/1993 | Duncan et al. |
| 5,228,986 | A | | 7/1993 | Ellis et al. |
| 5,246,571 | A | | 9/1993 | Woltmann |
| 5,332,409 | A | * | 7/1994 | Dralle ....................... 55/484 |
| 5,401,401 | A | | 3/1995 | Hickok |
| 5,423,978 | A | | 6/1995 | Snyder et al. |
| 5,457,665 | A | | 10/1995 | Reid |
| 5,540,107 | A | | 7/1996 | Silverman et al. |
| 5,593,578 | A | * | 1/1997 | Bryan et al. ............... 210/232 |
| 5,618,419 | A | | 4/1997 | Fuerst |
| 5,647,983 | A | | 7/1997 | Limcaco |
| 5,665,224 | A | | 9/1997 | Levene et al. |
| D398,184 | S | | 9/1998 | Silverberg et al. |
| 5,842,408 | A | * | 12/1998 | Hatta ........................ 99/323 |
| 5,900,138 | A | | 5/1999 | Moretto |
| 6,024,867 | A | | 2/2000 | Parise |
| 6,074,550 | A | | 6/2000 | Hofmann et al. |
| 6,106,709 | A | | 8/2000 | Bresolin |
| 6,224,751 | B1 | | 5/2001 | Hofmann et al. |
| 6,585,888 | B2 | | 7/2003 | Axelrod |

FOREIGN PATENT DOCUMENTS

| | | |
|---|---|---|
| EP | 0 349 315 A1 | 1/1990 |
| EP | 1415533 A1 | 5/2004 |
| GB | 2 269 586 A | 2/1994 |
| WO | WO 95/29131 A1 | 11/1995 |
| WO | WO 96/13318 A1 | 5/1996 |

OTHER PUBLICATIONS

Product Sheet—Penn Plaz Hang-on Power Filters, 2003.
Product Sheet—Eclipse Integrated Aquarium Systems—2003.
Product Sheet—Desktop Aquarium, www.Drs.FosterSmith.com, p. 94, prior to Sep. 20, 2005.
Product Sheet—New from Hydor, prior to Sep. 20, 2005.
Communication—International Search Report in International PCT Application No. PCT/US2005/033675.

* cited by examiner

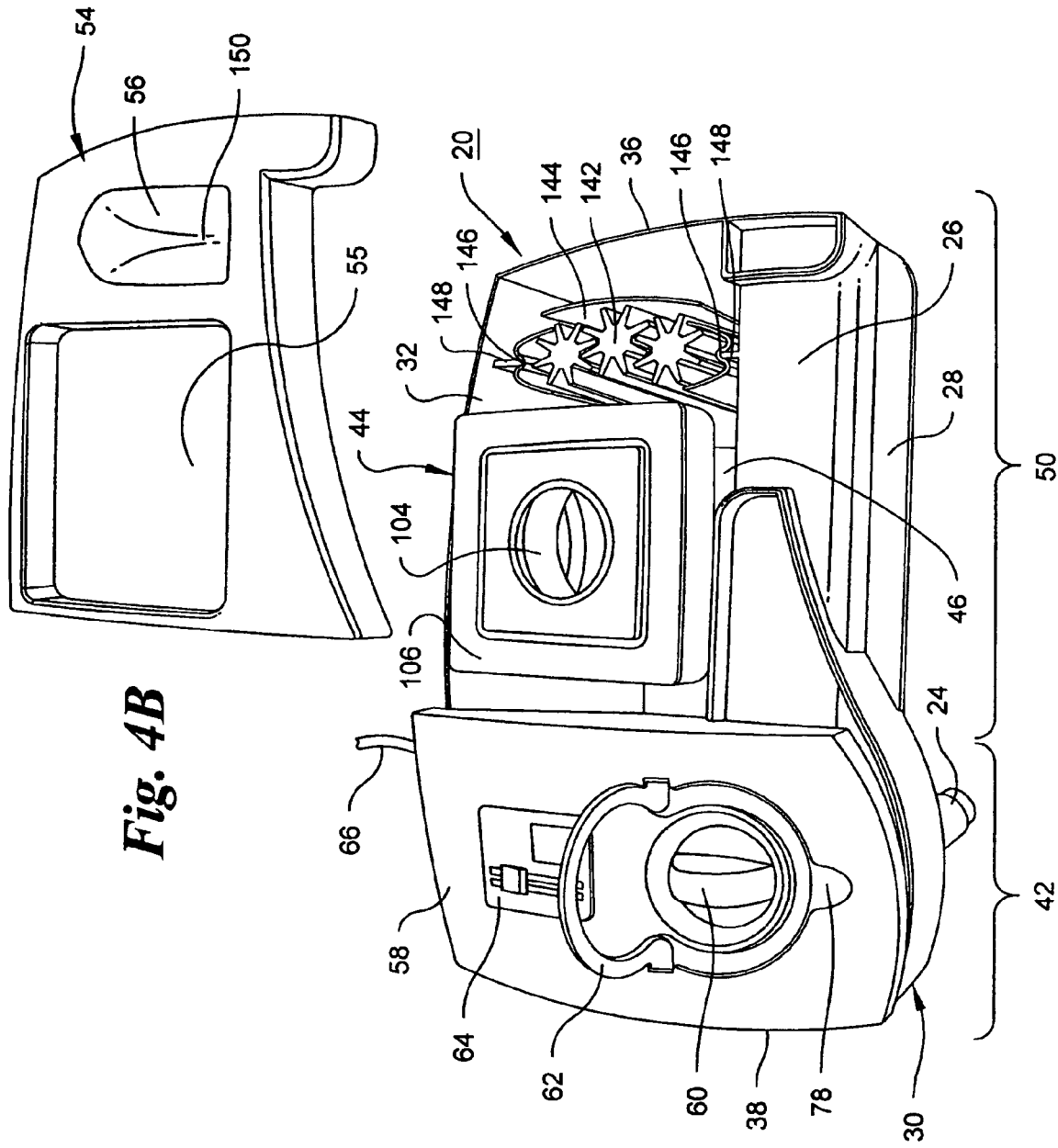

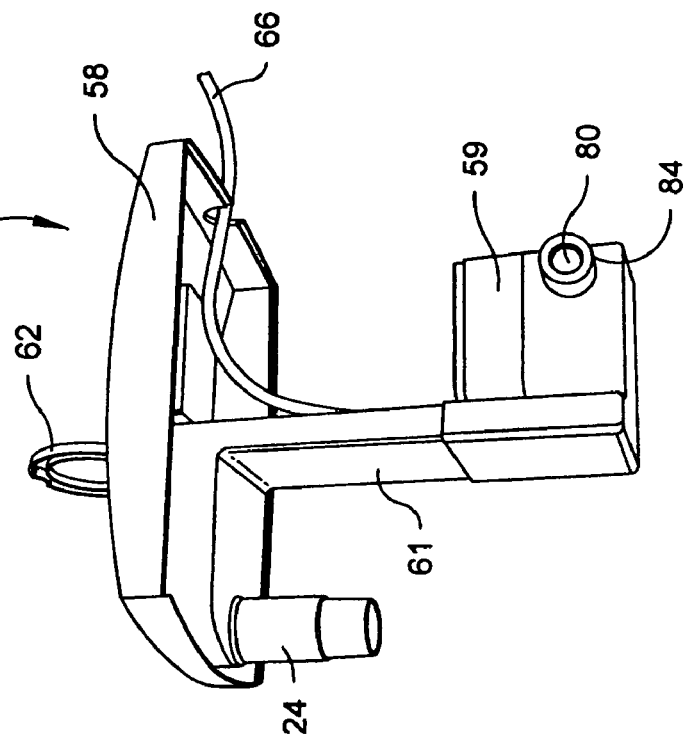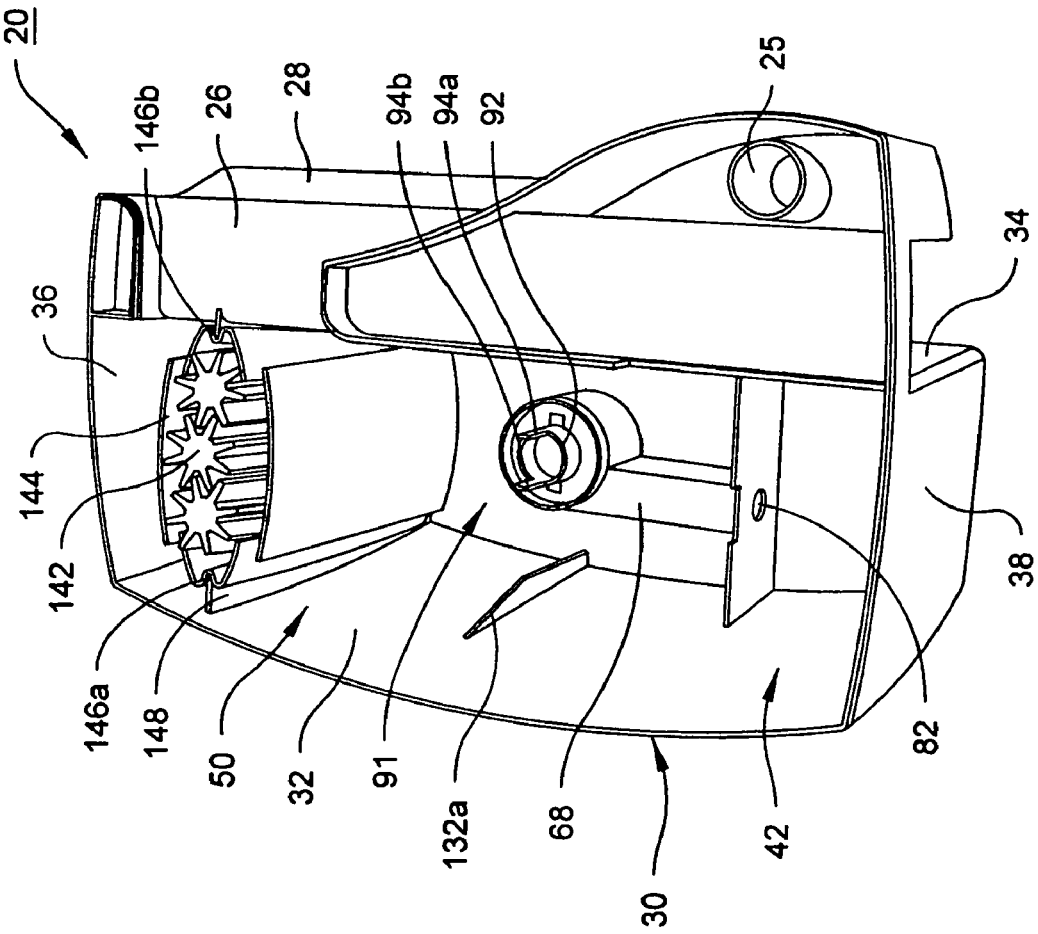

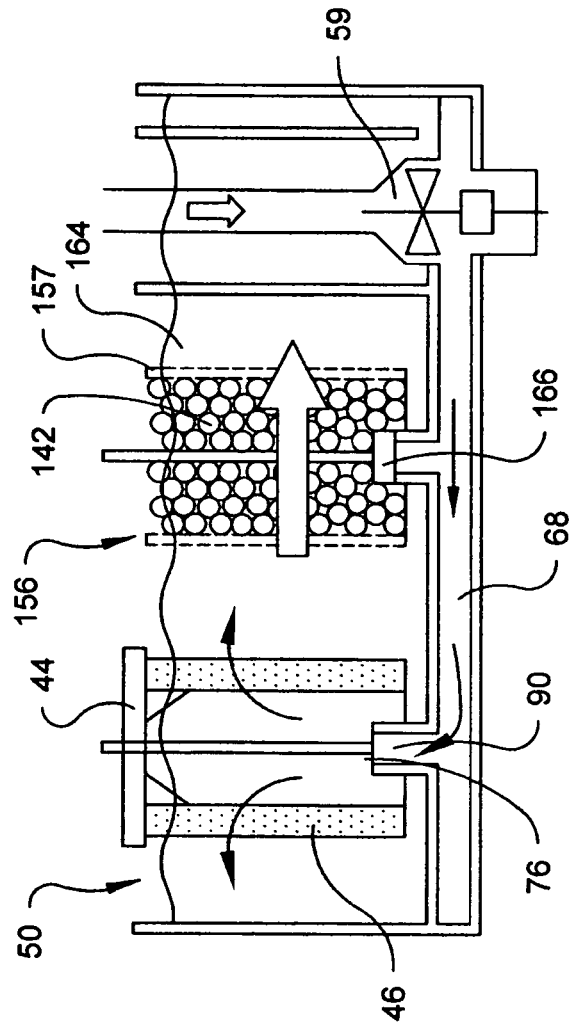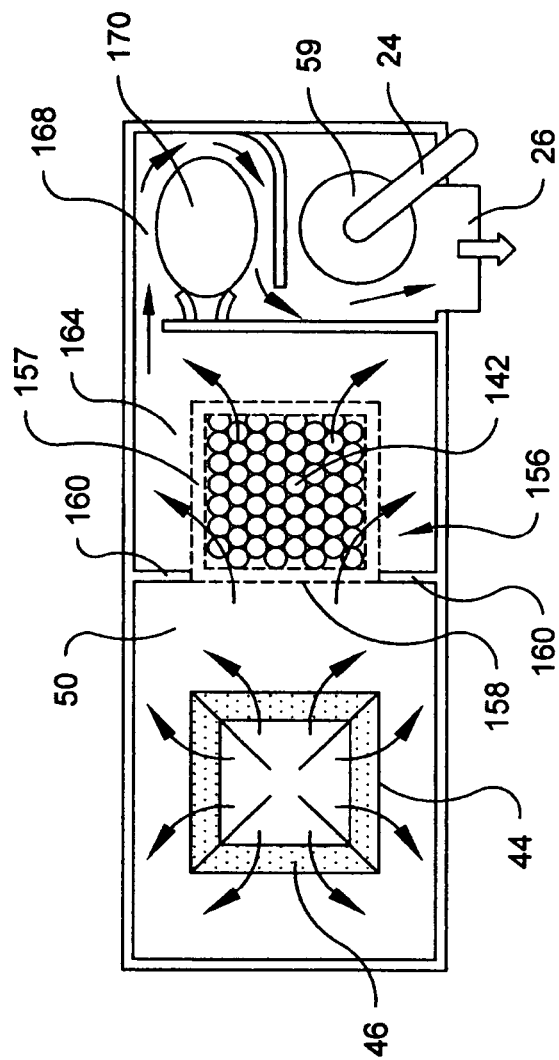

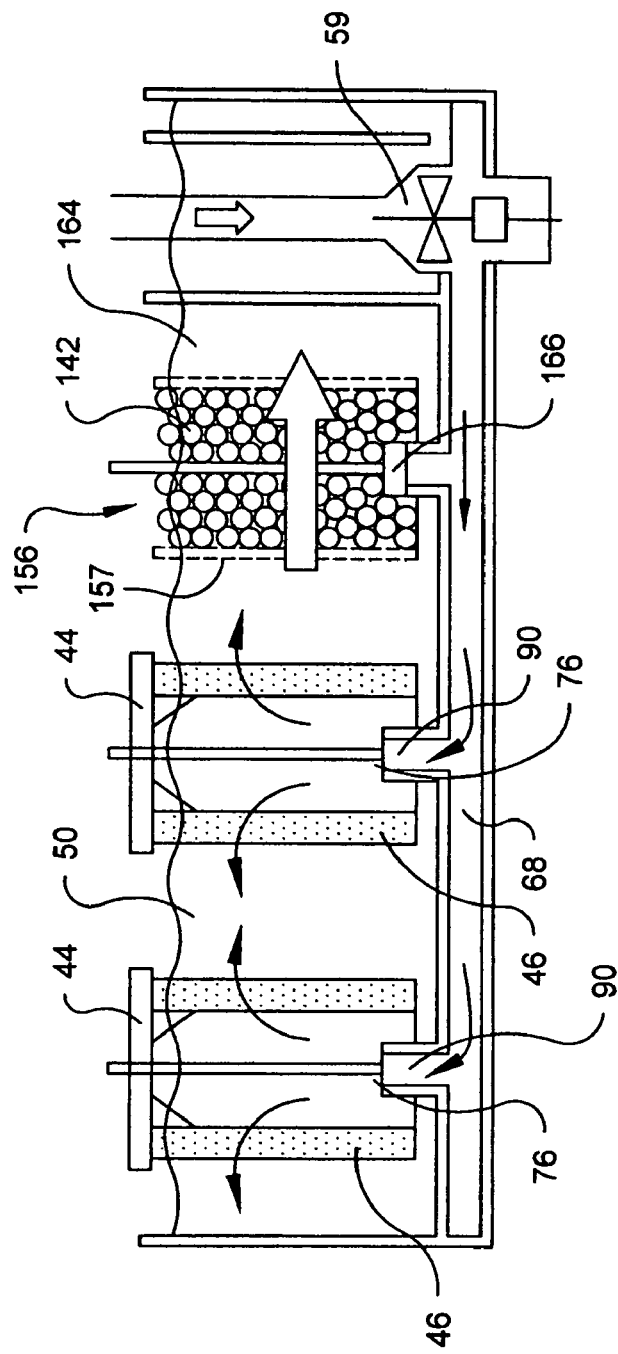
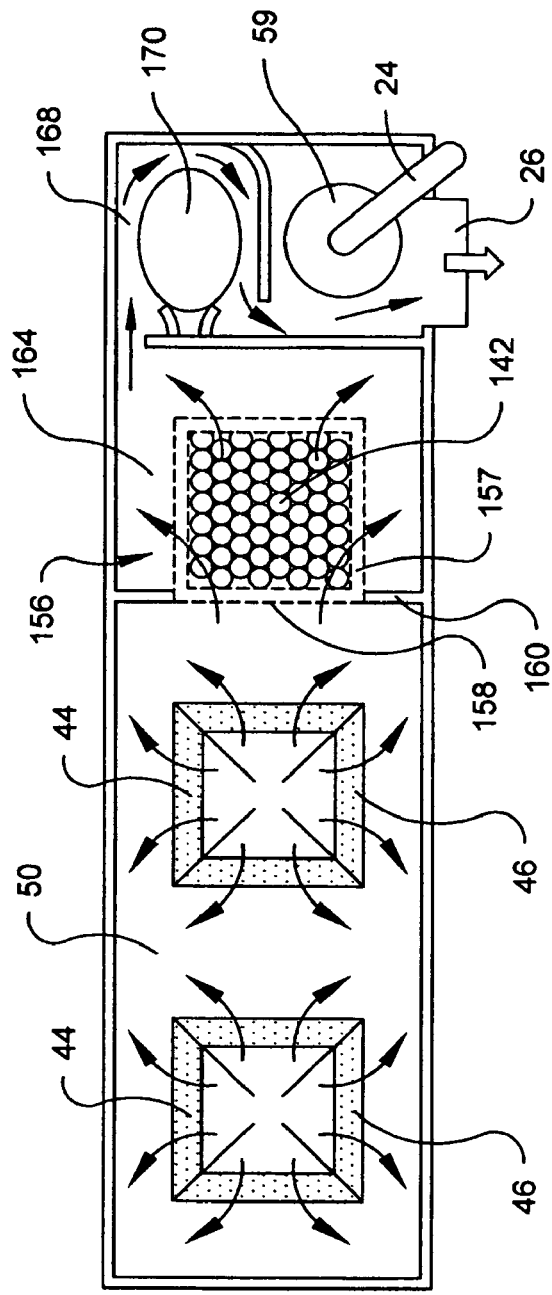

AQUARIUM FILTER ASSEMBLY

CROSS-REFERENCE TO RELATED APPLICATIONS

This patent application claims the benefit of Provisional U.S. patent application Ser. No. 60/611,649, filed Sep. 20, 2004, the entire disclosure of which is incorporated herein by reference.

BACKGROUND OF THE INVENTION

This invention generally relates to water filter assemblies, more particularly, to water filter assemblies used in aquariums.

Water filter assemblies used in aquariums are known in the art. One conventional type of aquarium filter assembly uses filter media resting on a floor of the filter assembly to filter aquarium water accumulated on top of the filter media. When the filter media is no longer effective and in need of replacement, a user must collect and replace the loose particles of the filter media. Thus, it is inconvenient and time-consuming to replace the filter media.

In other conventional aquarium filters, a filter cartridge containing filter media in a pocket in the cartridge is used to form a wall for aquarium water to flow from one side of the cartridge to the other, filtering the aquarium water in the process. In order to filter the aquarium water at an efficient rate, it is necessary to have a large filter cartridge with a fairly large surface area for filtration. Thus, the space required for the filter assembly is large and replacement of the cartridge is inconvenient and messy.

A need exists, therefore, for an aquarium filter assembly with an easily replaceable filter cartridge, which can be done without creating a mess. A need also exists for a compact yet efficient filter assembly capable of filtering aquarium water at an efficient rate. The present invention satisfies these needs and provides other advantages and benefits that will be apparent from the following disclosure.

BRIEF SUMMARY OF THE INVENTION

Briefly stated, one aspect of the present invention is directed to an aquarium filter assembly comprising: a filter assembly body having a front wall, a back wall, left and right side walls and a floor, a water supply section and a filtered water section, the aquarium filter assembly being adapted for liquid connection with an aquarium, a removable filter cartridge caddy within the filter assembly body; the removable filter cartridge caddy having a base with an outer peripheral wall extending upwardly from the base and an inner peripheral wall extending upwardly from the base surrounding an opening in the base, a support for a filter cartridge, a lift handle, a removable cover connectable to an upper portion of the support; the filter cartridge removably supportable on the support, the filter cartridge including a plurality of panels comprising filter material, the filter cartridge panels being connected to form a space inside the plurality of panels; and a water supply assembly within the water supply section to supply water from the aquarium to the filtered water section such that water flows from the water supply section through the filter cartridge supported by the caddy, into the filtered water section of the filter assembly body and then into the aquarium.

Another aspect of the invention includes a removable filter cartridge caddy for use in an aquarium filter comprising: a base with an outer peripheral wall extending upwardly from the base and an inner peripheral wall extending upwardly from the base and a tubular member surrounding an opening in the base, a support for a filter cartridge, the support being one of a central support and a peripheral support, a lift handle connected to the removable filter cartridge caddy, the lift handle formed with an upper portion of the support, and a removable cover connectable to one of an upper portion of the support and an upper portion of the filter cartridge.

Yet another aspect of the invention includes a filter cartridge for use in an aquarium, the filter cartridge including a plurality of panels with filter material, and the filter cartridge panels being connected in a polygonal shape other than a circle to form a space between opposing panels.

BRIEF DESCRIPTION OF THE SEVERAL VIEWS OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 4 comprises FIGS. 4A and 4B, where FIG. 4A is a top rear perspective view of the aquarium filter assembly of FIG. 1 with the filter assembly cover removed, while FIG. 4B is a top perspective view of the removed cover;

FIG. 5 comprises FIGS. 5A and 5B, where 5A is a top right perspective view of the aquarium filter assembly of FIG. 1 with the water supply assembly removed, and FIG. 5B is a left perspective view of the water supply component of FIG. 1;

FIG. 12 is a vertical cross-sectional view of a schematic representation of an aquarium filter assembly of another embodiment of the present invention;

FIG. 13 is a top plan view, with the cover removed, of the aquarium filter assembly of FIG. 12;

FIG. 14 is a vertical cross-sectional view of a schematic representation of an aquarium filter assembly of yet another embodiment of the present invention;

FIG. 15 is a top plan view, with the cover removed, of the aquarium filter assembly of FIG. 14;

DETAILED DESCRIPTION OF THE INVENTION

Figure 1:
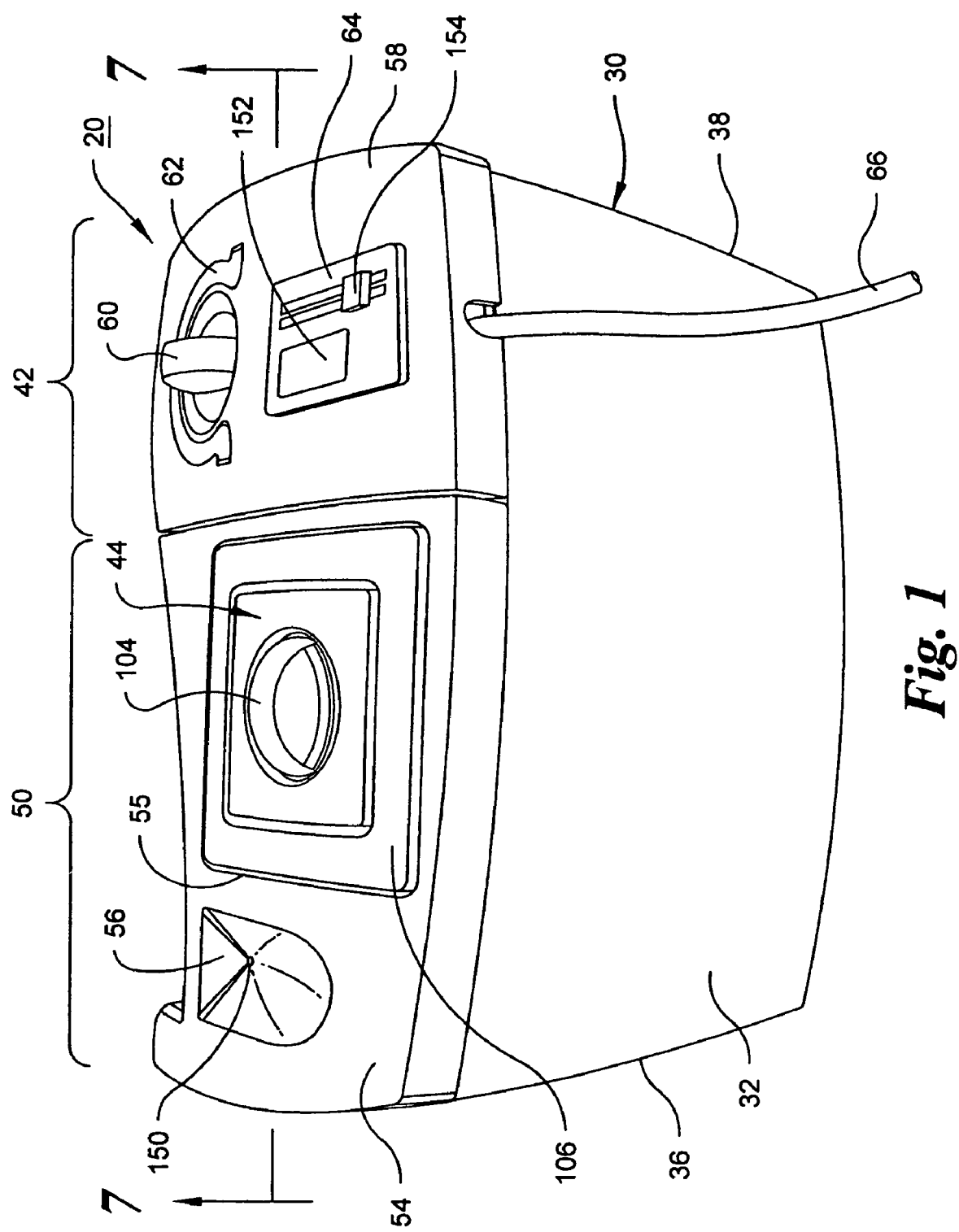
FIG. 1 is a front top perspective view of one embodiment of an aquarium filter assembly of the present invention.
Figure 2:
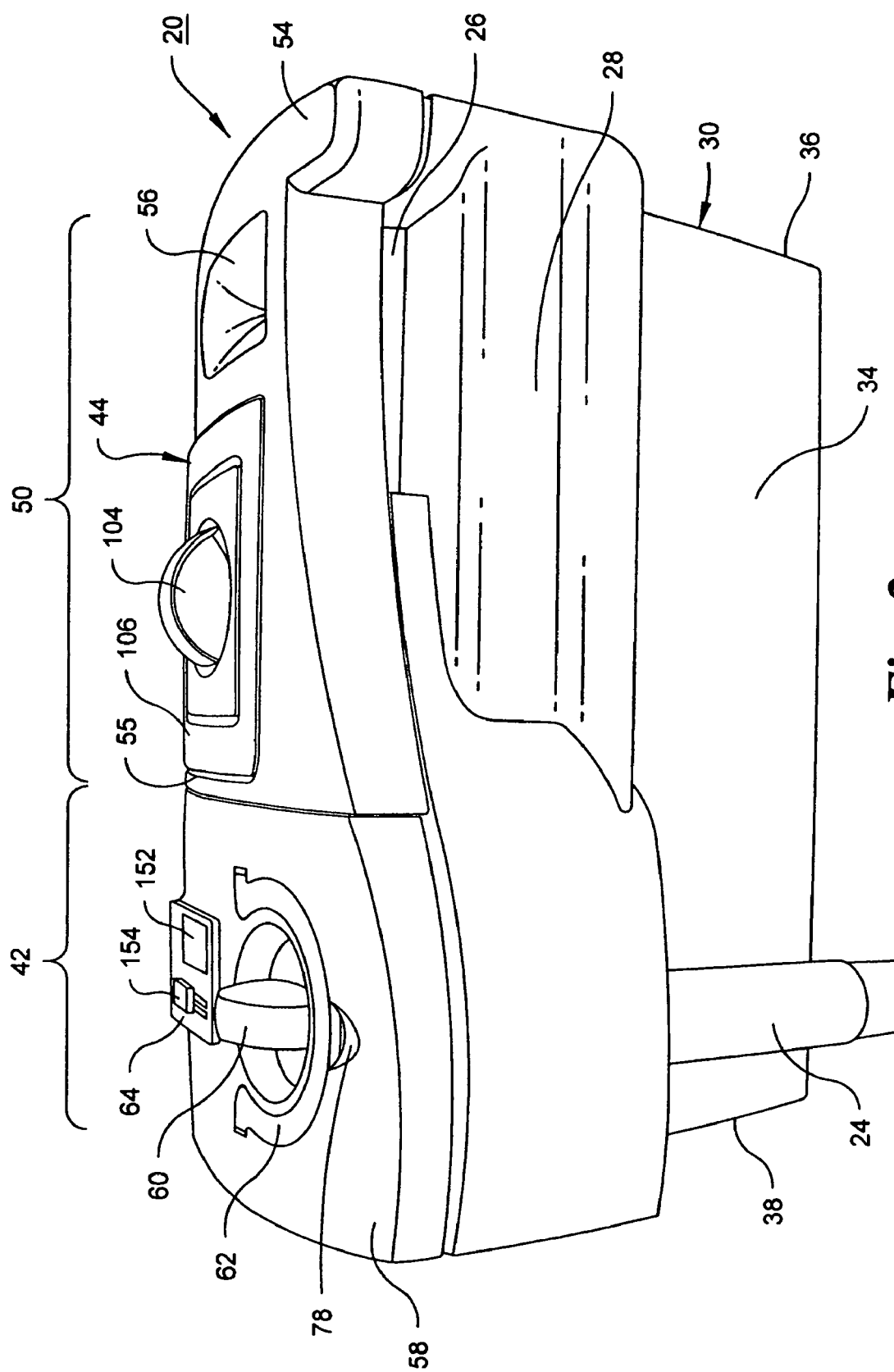
FIG. 2 is a rear perspective view of the aquarium filter assembly of FIG. 1.

Certain terminology is used in the following description for convenience only and is not limiting. The words "front," "back," "right," "left," "upper," "top,"and "lower" designate directions in the drawings to which reference is made. The words "inwardly" and "outwardly" refer to directions toward and away from, respectively, the geometric center of the water filter cartridge caddy and installed filter cartridge thereof. The word "a" is defined to mean "at least one." The terminology includes the words above specifically mentioned, derivatives thereof, and words of similar import.

Figure 3:
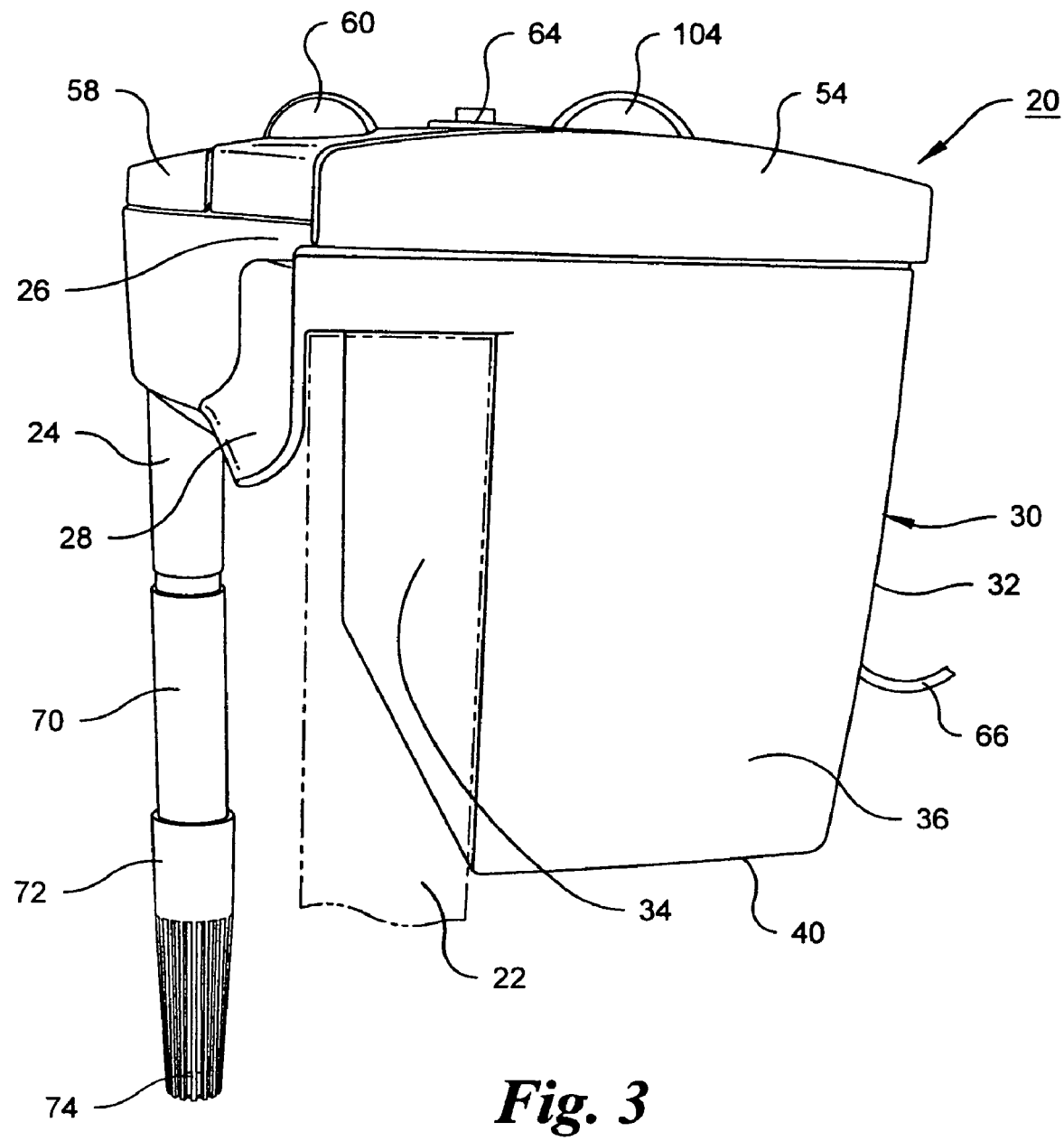
FIG. 3 is a left side perspective view of the aquarium filter assembly of FIG. 1.

Referring to the drawings in detail, wherein like numerals indicate like elements throughout the figures, there is shown an aquarium filter assembly, generally designated 20, which is used to filter water used in an aquarium for fish or other aquatic animals and/or aquatic plants. The aquarium filter assembly 20 is adapted for liquid connection with an aquarium and may hang on a wall 22 (shown in phantom in FIG. 3) of the aquarium outside of or within the aquarium, or be retained above or elsewhere with respect to the aquarium, standing alone or as a part of a separate compartment that may also contain other aquarium devices, such as lighting ballasts, transformers and air pumps, etc. As shown in FIG. 3, a preferred embodiment of the aquarium filter assembly 20 hangs on the top of the wall 22 of the aquarium and largely outside of the aquarium, with an inlet tube 24 extending into the aquarium. The filtered and otherwise treated water flows from the aquarium filter assembly 20 via a filter outlet 26 over a discharge lip 28 overhanging the top of the wall 22 of the aquarium and back into the aquarium.

Referring to FIGS. 1-7, the aquarium filter assembly 20 includes a filter assembly body 30 having a front wall 32, a back wall 34, a left side wall 36, right side wall 38 and a floor 40, a water supply section 42 and a filtered water section 50. A removable filter cartridge caddy 44 is within the filter assembly body 30 in the water supply section 42 and includes a filter cartridge 46. A water supply assembly 48 is located within the water supply section 42 to supply water from the aquarium to the filtered water section 44 through a manifold 68, such that water flows from the water supply section 42 through the filter cartridge 46 supported by the removable filter cartridge caddy 44, into the filtered water section 50 of the filter assembly body 30 and then into the aquarium. The aquarium filter assembly 20 also includes a filter assembly cover 54 that preferably includes a dosing port 56. Associated with the water supply section 42 of the aquarium filter assembly 20 are a water supply cover 58, a pump 59, a flow control knob 60, a lift handle 62, an optional indicator assembly 64, and a power cord 66, as can be seen in FIG. 1. The filter assembly 20, including the assembly body 30, the assembly cover 54, water supply assembly cover 58, and other components, may be made of a material, preferably a synthetic polymeric plastic material, which can be molded or machined such as acrylonitrile butadiene styrene (ABS), polypropylene (PP), and polystyrene (PS). Various additives to the polymeric plastic material can be utilized such as talc, colorants, plasticizers, mold releasing agents, etc. For example, the ABS, PP, or PS can be combined with up to 40 weight % talc to absorb pump vibrations. Most of the filter assembly components are currently preferably made of PP with 40 weight % talc. Different compounds can be used for different parts of the filter. For example, it is preferred that the pump casing and support be made of ABS.

The water supply assembly 48, best shown in FIGS. 2, 5A, 5B and 7, extracts water from the aquarium using the inlet tube 24 and pumps the water into the manifold 68. The inlet tube 24 preferably extends through a guide tube 25 in the filter assembly body 30, and is attached to a pump inlet tube 61, best seen in FIG. 5B. As shown in FIG. 3, a tube extension 70 is attached to the inlet tube 24. Preferably, the inlet tube 24 and the tube extension 70 fit together using a friction fit. One skilled in the art, in view of the present disclosure, would recognize that there are many ways to attach the inlet tube 24 and the tube extension 70 together such as a threaded connection or a lock and snap connection. Attached to the tube extension 70 is a grated tube 72, which is attached in a similar fashion as the inlet tube 24 and the tube extension 70. The grated tube 72 includes a plurality of slits 74 as shown in FIG. 3 to allow water from the aquarium to be filtered to enter tubes 72, 70 and 24. One skilled in the art would appreciate that the grated tube 72 prevents the fish and other aquarium creatures from being sucked into the pump 82 and aquarium filter assembly 20 and that similar designs could be used and not depart from the invention. In lieu of or in addition to the tube extension 70 and/or grated tube 72, a tubular heater (not shown) having a grated entry port may be connected onto the inlet tube 24 of the aquarium filter assembly 20. The heater would heat the water to a particular desired temperature before the water enters the aquarium filter assembly 20.

Figure 7:
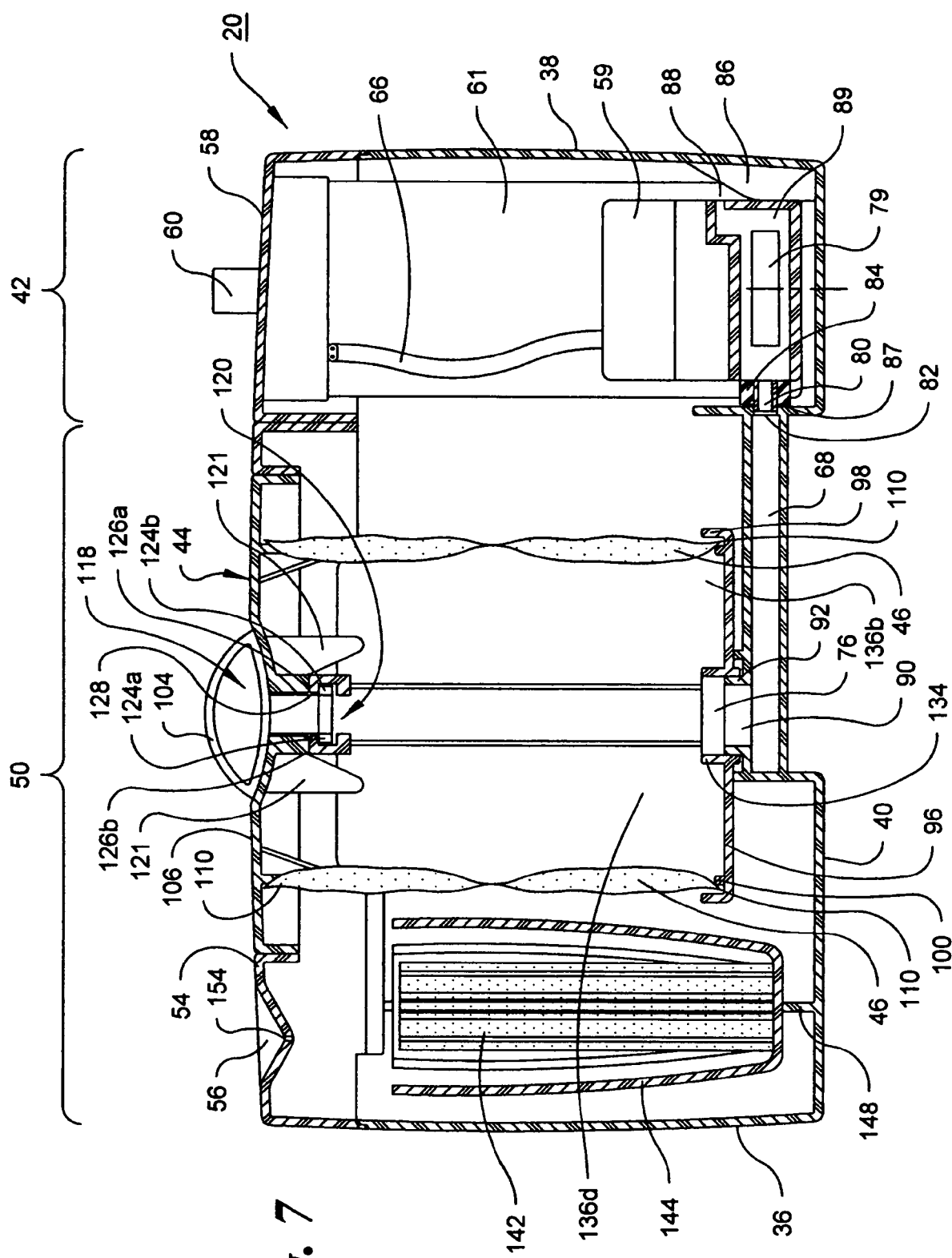
FIG. 7 is a vertical cross-sectional view of the aquarium filter assembly of FIG. 1 taken along the line of 7-7 of FIG. 1.

Referring to FIGS. 5A, 5B and 7, the aquarium filter assembly 20 includes the motor driven pump 59 operatively connected to the aquarium filter assembly 20 and an opening 76 of the removable filter cartridge caddy 44 or openings 76 if more than one removable filter cartridge caddy 44 is present. The pump 59 pumps water from the aquarium up through the inlet tube 24 at a steady rate and allows for an efficient filtering process. It is preferred that the pumping rate is about 162 U.S. gallons (600 liters) per hour for an aquarium holding about 27 U.S. gallons (100 liters) to about 40 U.S. gallons (150 liters) of water and approximately 270 U.S. gallons (1000 liters) per hour for an aquarium holding up to approximately 68 U.S. gallons (250 liters) of water. One of ordinary skill in the art would recognize in view of the present disclosure that the pumping rate could be varied so long as the filtering process is effective. For a small aquarium, one removable filter cartridge caddy 44 may be sufficient. For medium and large aquariums, two or three removable filter cartridge caddies 44 may be sufficient, respectively. Referring to FIGS. 1, 5A, 5B and 7, the pump 59 is removably positioned in the water supply section 42 of the filter assembly body 30. The lift handle 62 on the water supply cover 58 is preferably recessed in the water supply cover 58 and lifts up from the water supply cover 58 and provides a means for lifting the pump 59 directly out of the water supply section 42 of the filter assembly body 30. A recessed portion 78 on the water supply cover 58 provides access to the lift handle 62. Having a pump 59 that is removable allows for easier cleaning and maintenance of the components.

The pump 59 is not limited to a specific type of pump however, as an example it contains, an impeller 79 as shown in FIG. 7. Electric power preferably is supplied to the pump 59 via a power cord 66 extending from a suitable source of electricity. The pump 59 has a pump inlet tube 61, best seen in FIG. 5B extending preferably at right angles and connected to the inlet tube 24 at an inlet portion and to a discharge port (not shown) into the pump chamber 89 which is operably connected to the inlet tube 24 and an outlet 80. When the pump 59 is placed into the filter assembly body 30, the outlet 80 for the pump 59 abuts an inlet 82 of the manifold 68. Optionally, the outlet 80 for the pump 59 can fit into the manifold inlet 82. A polymeric seal 84, such as natural or synthetic rubber, around the outlet 80 of the pump 59 creates a seal between the outlet 80 of the pump 59 and the manifold inlet 82. A pump alignment rib 86 extending from the right sidewall 38 and floor 40 of the filter assembly body 30 causes the pump 59 and the polymeric seal 84 around the pump outlet 80 to gently press against the manifold inlet 82, thereby creating a water seal. A flow control knob 60 is operably connected to a valve (not shown) within the water supply assembly 48 to adjust the flow rate of the water being pumped from the aquarium into the filter assembly 20.

Optionally, but preferably, the pump can include two water bypass areas 110. For example, the pump outlet 80 can include an annular gap 87 to allow water to bypass when pressure increases in the manifold 68, which may occur if the filter cartridge 46 is not changed on a timely basis and becomes clogged. Also, the pump 59 can include a priming inlet/outlet 88 which allows the priming of the pump when the filter is started so that water can enter the pump chamber 89 and air bubbles can escape. Preferably, this priming inlet/outlet 88 is placed in a low pressure area of the water supply section 42. This can also act as a water bypass when the filter cartridge 46 is clogged.

Figure 6:
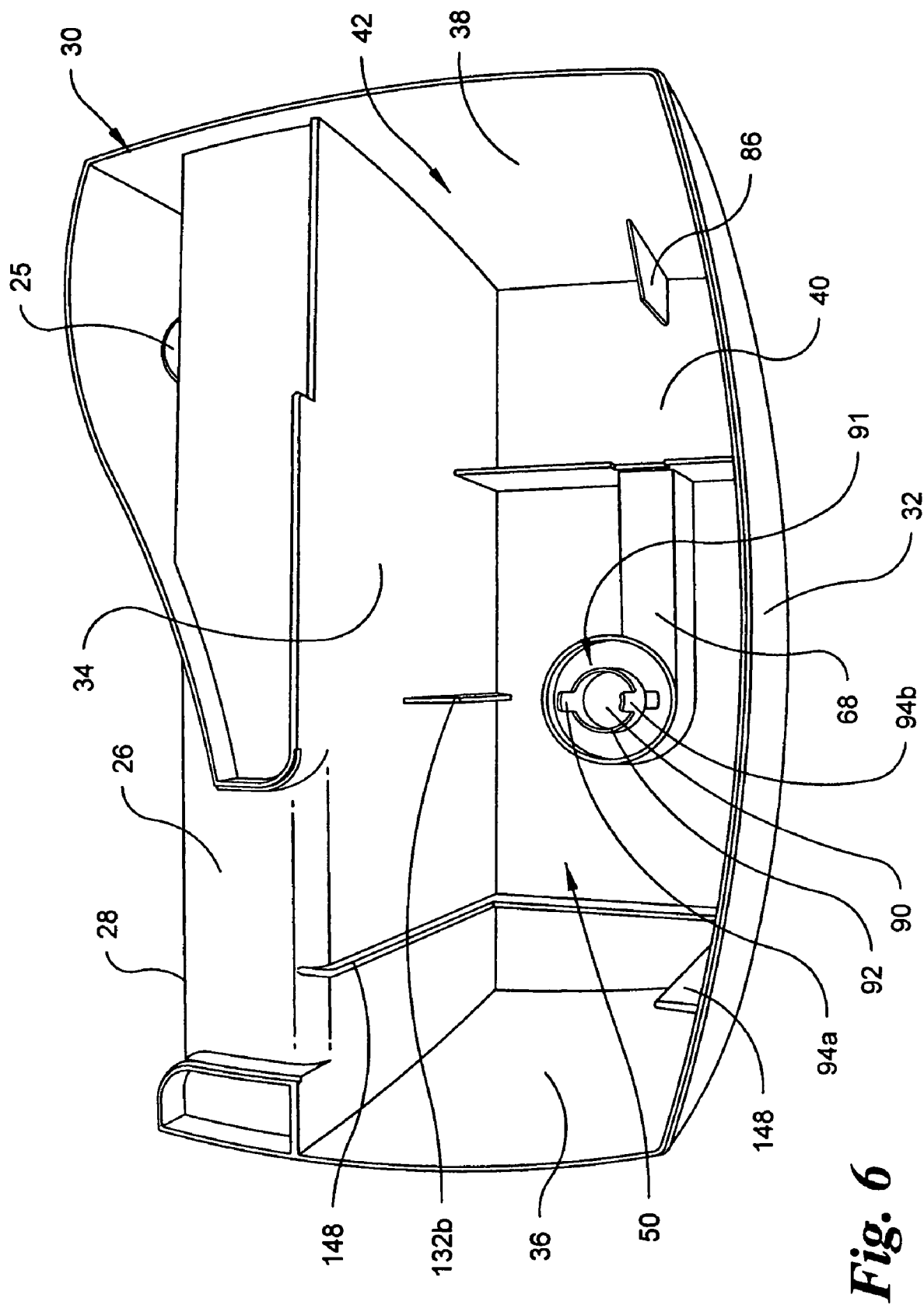
FIG. 6 is a top front perspective view of the body of the aquarium filter assembly of FIG. 1 with the cover, water supply assembly and biological filter removed.

Referring to FIGS. 5A, 6, and 7, the aquarium filter assembly 20 preferably includes a manifold 68 in the form of a chamber between the floor 40 of the filter assembly body 30 and a base 96 of the removable filter cartridge caddy 44. The manifold 68 extends from the water supply section 42 to one or more removable filter cartridge caddies 44, preferably along the floor 40. The manifold 68 is fluidly connected to the aquarium through the water supply assembly 48 where water from the aquarium enters the manifold 68 through the inlet 82 and exits the manifold 68 through an outlet 90 and into one or more removable filter cartridge caddies 44. The manifold 68 routes water from the pump 59 to the appropriate removable filter cartridge caddy 44. The manifold 68 may contain a plurality of outlets 90 to a plurality of removable filter cartridge caddies 44 with each removable filter cartridge caddy 44 including a filter cartridge 46 as depicted in FIGS. 14 and 15 (which will be described in detail later) to accommodate sufficient filtering capacity for different biological loads based on type, number species, etc. of aquatic life in the aquarium, the size of the aquarium and the like. Preferably, the manifold 68 is an integral, unitary part of and molded into the floor 40 of the filter assembly body 30 using thermoforming, injection molding or other suitable, well-known techniques. One of ordinary skill in the art will recognize in view of the present disclosure that a distributor acting in a capacity as the manifold 80 could be located remotely from the aquarium filter assembly 20 so long as a fluid connection exists between the aquarium and the removable filter cartridge caddy 44.

As shown best in FIG. 6, the manifold outlet 90 preferably has a mounting structure 91 in which the removable filter cartridge caddy 44 can rest. The mounting structure 91 includes an extended tube 92 with two prong like structures 94a, 94b on opposing sides of the extended tube 92. The two prong like structures 94a, 94b fit into the underside of the base 96 of the removable filter cartridge caddy 44 and help stabilize and position the removable filter cartridge caddy 44. Preferably, the mounting structure 91 fits into the removable filter cartridge caddy 44 opening 76 so that the water from the manifold 68 efficiently enters into the removable filter cartridge caddy 44.

After taking water in from the aquarium through the inlet tube 24, the pump 59 delivers the water to the manifold 68 that distributes aquarium water to one or more removable filter cartridge caddies 44 through their respective openings 76. During the filtering process, the manifold 68 is continuously full of water and continuously feeds the removable filter cartridge caddy or caddies 44 for filtering. The filtered water exits the removable filter cartridge caddies 44 through a filter cartridge 46 and into the filtered water section 50.

Figure 8:
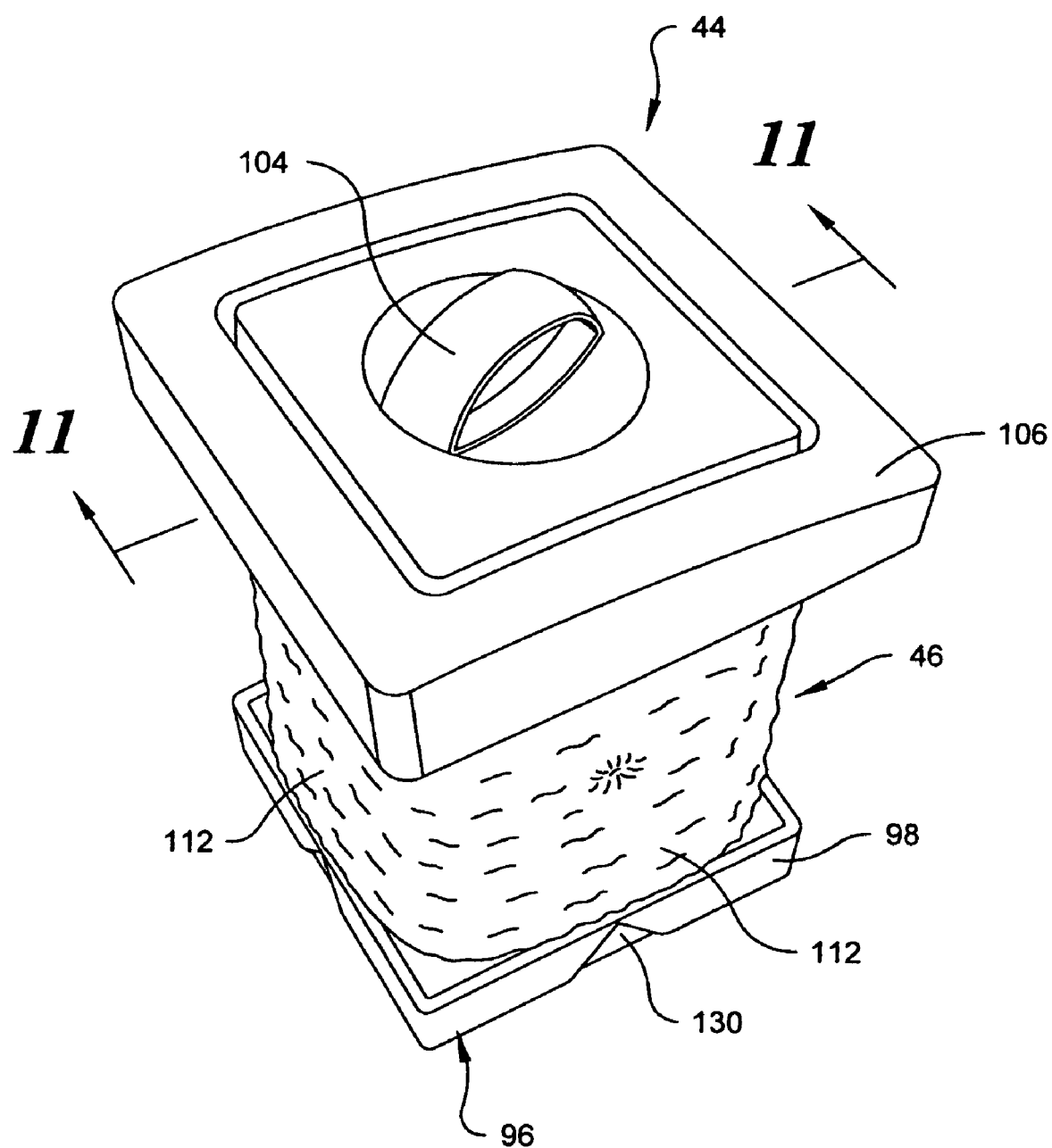
FIG. 8 is a top perspective view of one embodiment of a filter cartridge caddy used in the aquarium filter assembly of FIG. 1.
Figure 9:
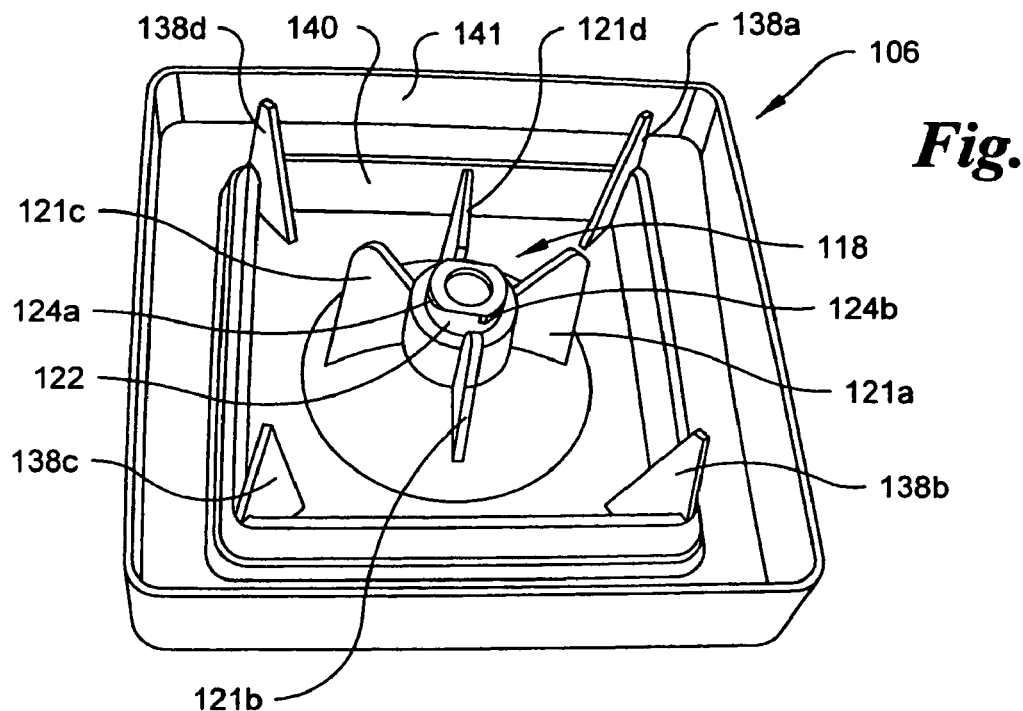
FIG. 9 is a bottom perspective view of the top cover of the filter cartridge caddy of FIG. 8.
Figure 10:
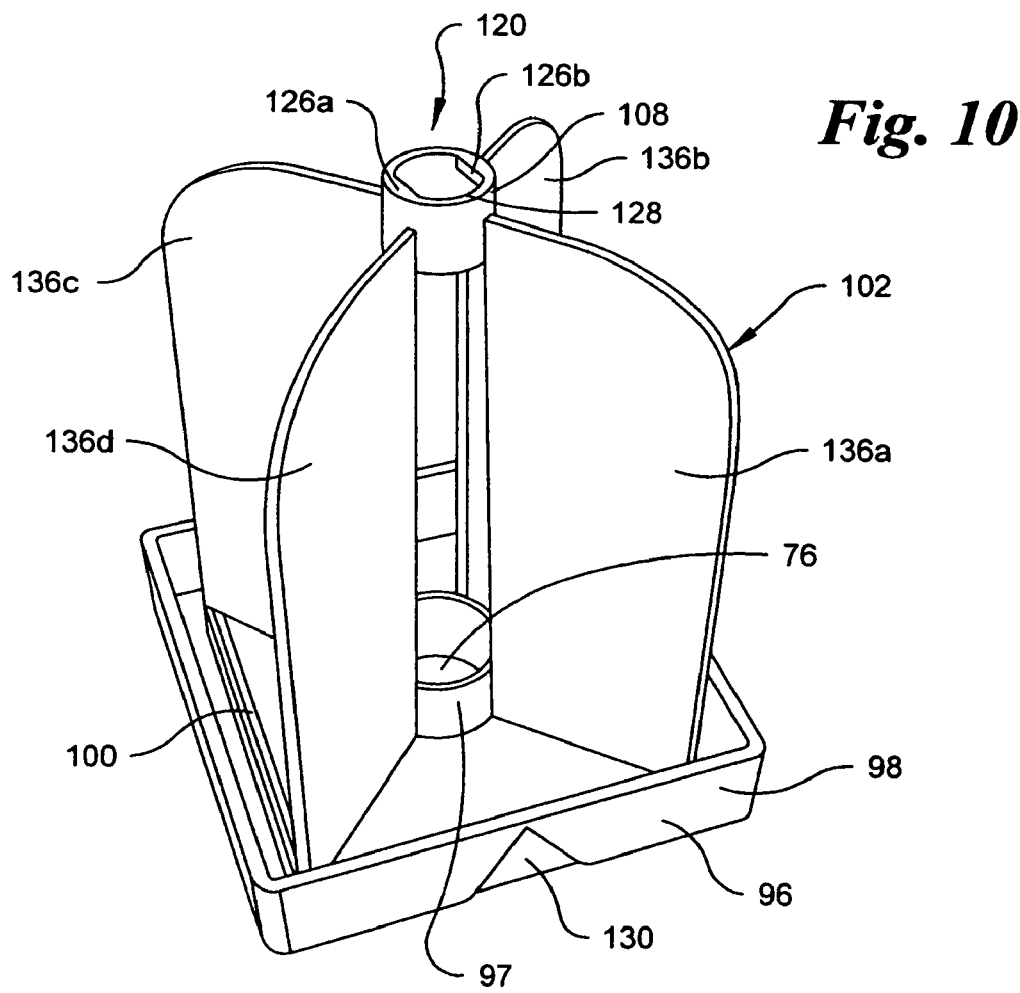
FIG. 10 is a front top perspective view of the bottom of the filter cartridge caddy of FIG. 8.

The removable filter cartridge caddy 44, as best depicted in FIGS. 8, 9 and 10, has a base 96 with an outer peripheral wall 98 extending upwardly from the base 96 and an inner peripheral wall 97 extending upwardly from the base 96 surrounding the opening 76 in the base 96, a support 102 for a filter cartridge, a lift handle 104 connected to the removable filter cartridge caddy 44, and a removable cover 106 connectable to an upper portion of the support 108. The filter cartridge 46 is removably supportable on the support 102. The filter cartridge 46 includes a plurality of panels 112 comprising filter material. The filter cartridge 46 panels 112 are connected to form a space inside the plurality of panels 112. At least one optional water bypass area 110 for water to bypass the filter cartridge 46 if the filter cartridge 46 is clogged may also be included. Each aspect of the removable filter cartridge caddy 44 will be described in greater detail, as follows.

The removable filter cartridge caddy 44 includes a filter cartridge support 102 that is preferably in a central position with respect to the base 96 of the removable filter cartridge caddy 44. The support 102 includes a lift handle 104 on the removable cover 106. The lift handle 104 is interlockingly connected to an upper portion 108 of the support 102 by way of a locking mechanism 116.

Referring to FIGS. 9 and 10, the locking mechanism 116 includes a male portion 118 and a female portion 120. The male portion 118 is guided into the female portion 120 by the guiding wedges 121a, 121b, 121c and 121d surrounding the male portion 118 on the underside of the removable cover 106. The male portion 118 includes a column 122 which is connected to the lift handle 104 on a first end and is rotatably controlled by the lift handle 104. On a second end of the column 122, opposite the lift handle 104, the column 122 has a substantially oblong shape that has two wedge shaped cams 124a, 124b each extending partly around the column 122. The wedge shaped cams 124a, 124b are positioned such that when the male portion 118 is fitted into the female portion 120, upon rotating the lift handle 104, the removable filter cartridge caddy cover 104 becomes securely fastened onto the upper portion of the support 102 of the removable filter cartridge caddy 44. The female portion 120 comprises the upper portion 108 of the support 102 wherein two opposing lips 126a, 126b extend inwardly from a rim 128 of the upper portion of the support 108. The male portion 118 is inserted into the female portion 120 so that the cams 124a, 124b align with the portion of the rim 128 not occupied by the lips 126a, 126b. After the male portion 118 is inserted into the female portion 120 and the lift handle 104 is rotated, the cams 124a, 124b slide underneath and bear against the lips 126a, 126b, so that the removable cover 106 cannot be pulled from the base 96. Thereby lockingly attaching the removable cover 106 to the base 96 without rotating the lift handle 104 in the opposite direction until the cams 124a, 124b are free of the lips 126a, 126b. One of ordinary skill in the art will recognize that other mechanisms could be substituted, for example, a friction fit mechanism, a bayonet lock mechanism, or the like, in view of the present disclosure.

The base 96 of the removable filter cartridge caddy 44 has an outer peripheral wall 98 extending upwardly from the base 96 and an inner peripheral wall 97 extending upwardly from the base 96 surrounding the opening 76 in the base 96. The outer peripheral wall 98 contains triangular guides 130 which are recesses on the outer side of the outer peripheral wall 98. The triangular guides 130 align with projections 132a, 132b that extend from the floor 40 and the front wall 32 and back wall 34 of the filter assembly body, 30, as best seen in FIGS. 5A and 6. The purpose of the projections 132a, 132b is to guide the removable filter cartridge caddy 44 into place and the base 96 onto the prong like structures 94 of the manifold 68 outlet 90 so that the removable filter cartridge caddy 44 is securely positioned.

The outer peripheral wall 98, in combination with the inner peripheral wall 97, defines a reservoir which will hold any water and any filtered material that would otherwise drip from the filter cartridge 46 when it is time to change the filter cartridge 46 by removing the removable filter cartridge caddy 44 from the filter assembly body 30. Thus, the base 96 and the outer and inner peripheral walls 98 and 97 form a tray that allows for a clean, convenient way to change the filter cartridge 46.

The intermediate peripheral wall 100 helps stabilize the support 102 and the filter cartridge 46 and forms a channel with the outer peripheral wall 98 for retaining the lower edge of panels 112 of the filter cartridge 46. The filter cartridge support 102 has an X-shaped horizontal cross-section with legs 136a, 136b, 136c and 136d extending radially outwardly from the inner periphery wall member 97 towards the corners of the base 96. FIG. 10 depicts this embodiment. The legs 136a, 136b, 136c and 136d in FIG. 10 are shown as being solid and rounded near the top edges, which is an option to facilitate guiding the application of the filter cartridge 46 onto the removable filter cartridge caddy 44. The filter cartridge 46 panels 112 are retained between the outer edges of the legs 136a, 136b, 136c and 136d and supports 138a, 138b, 138c and 138d on the removable cover 106, and the inner surface of the outer peripheral wall 98 on the base 96 of the removable filter cartridge caddy 44. Also, the inner peripheral wall 140 of the removable cover 106 helps to brace the supports 138a, 138b, 138c and 138d. The space between the inner peripheral wall 140 and an outer peripheral wall 141 extending from the bottom surface of the cover 106 forms a channel to support the upper edges of the panels 112 of the filter cartridge 46. One of ordinary skill in the art would appreciate that comparable designs are contemplated and would accomplish the same objective, in view of the present disclosure. For example, the legs 136a, 136b, 136c and 136d could readily be redesigned, in view of the present disclosure, such that a skeletal frame or a peripheral support with openings could be used instead of the legs 136a, 136b, 136c and 136d shown in FIG. 10. Additionally, the number of legs 136a, 136b, 136c, 136d used is not limited to four. For example, this invention includes instances where the boundary of the filter cartridge 46 formed by outermost points of a horizontal cross-section of the filter cartridge support 102 would have at least three sides.

In another embodiment, the filter cartridge support 102 is a peripheral support (not shown) that extends upward from the corners of the base 96 of the removable filter cartridge caddy 44 so as to create a frame in the form of a box frame. In an additional embodiment, the peripheral support could extend upward from two or more sides of the base 96. One way to cause the removable cover 106 to engage the filter cartridge support 102 in the form of a box frame would be a friction type of fit.

In a preferred embodiment, the water bypass area 110 of the removable filter cartridge caddy 44 comprises the area that is directly above and below each of the panels 112 of the filter cartridge. If the filter cartridge 46 becomes clogged, the water pressure will become great enough to cause the panels 112 to bow a little at the top and the bottom, which will allow water to escape. Although this is not an ideal situation, it does allow the water to continue to flow through the filter assembly body 30 and out into the aquarium even if the filter cartridge becomes clogged such that water cannot pass through the panels 112 of the filter cartridge.

Figure 11:
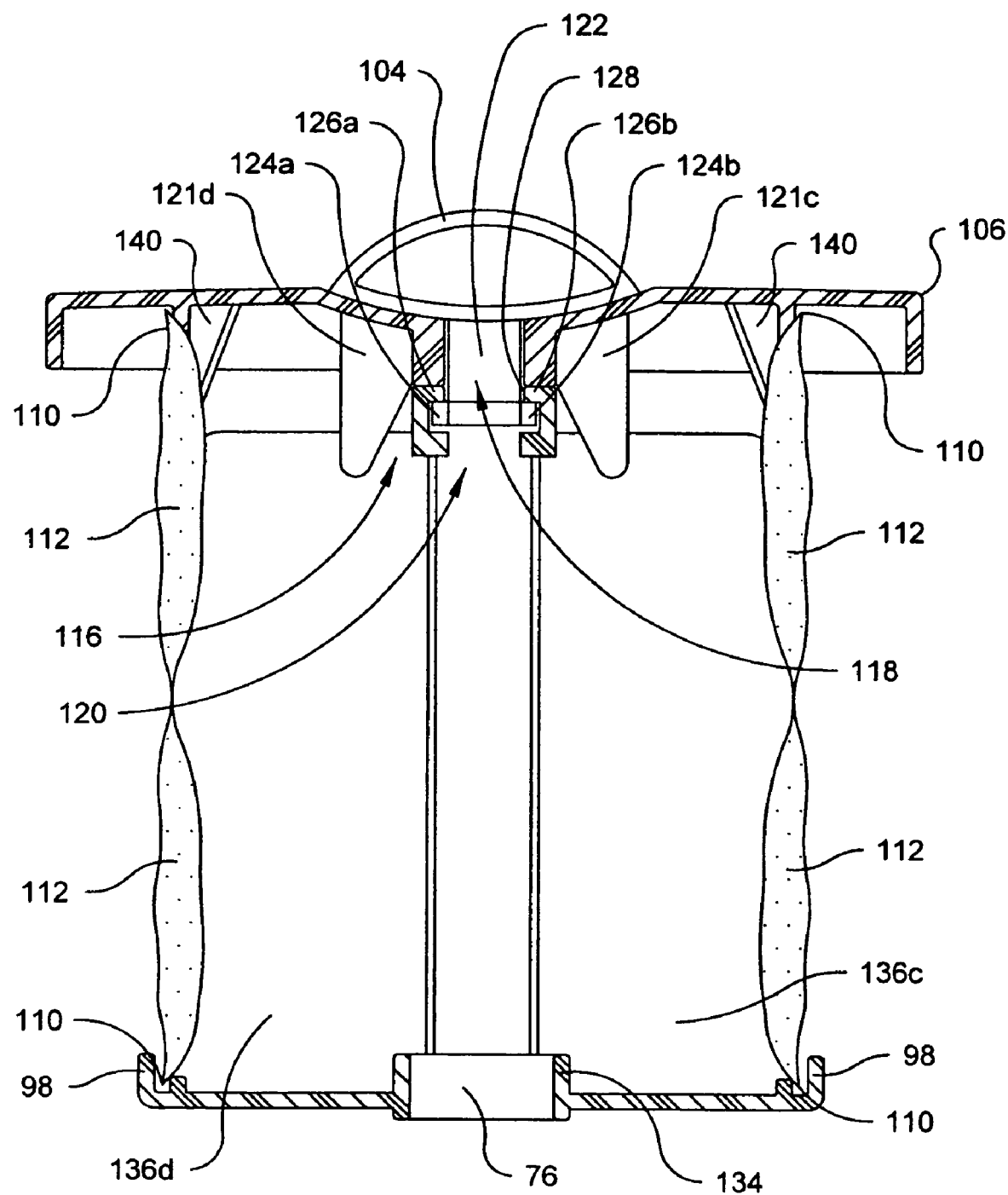
FIG. 11 is a vertical cross-sectional view of the filter cartridge caddy of FIG. 8, shown separately and enlarged with respect to the cross-section shown in FIG. 7, with the top cover of FIG. 9 connected to the bottom of the filter cartridge caddy of FIG. 10.
Figure 18:
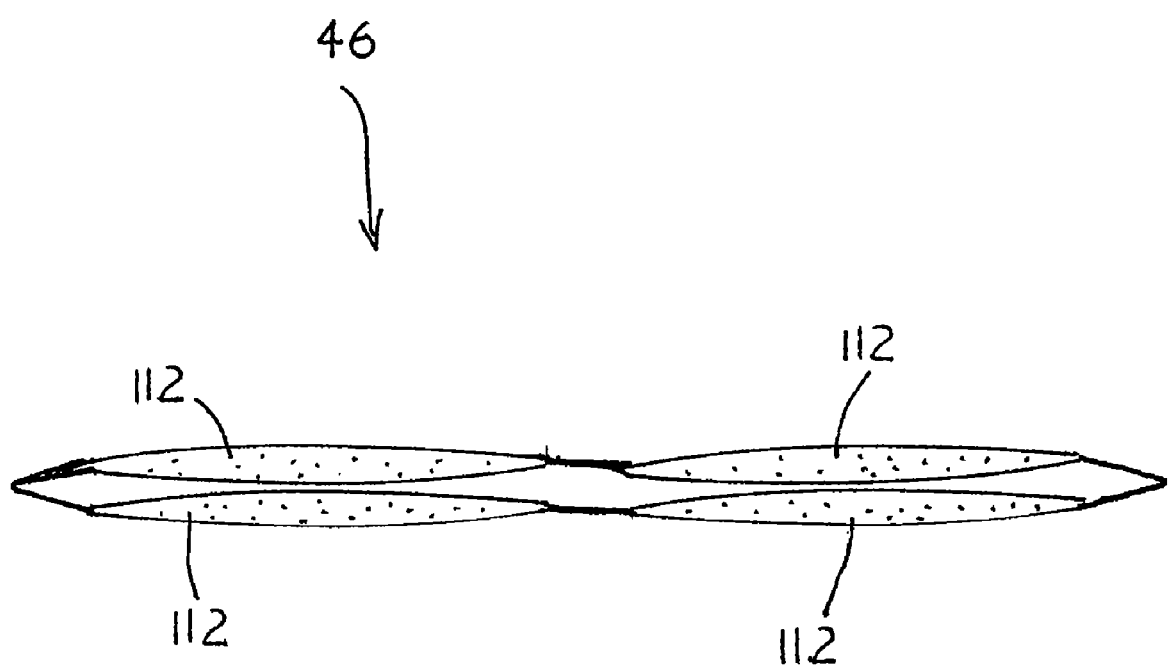
FIG. 18 is a top plan view of a filter cartridge lying on its front and one side in a folded condition that is relatively flat.

In yet another aspect, the present invention is directed to a filter cartridge 44 for use in an aquarium where the filter cartridge 46 includes a plurality of panels 112 with filter material and the filter cartridge panels 112 are connected in a substantially polygonal shape other than a circle to form a space between opposing panels 112 or inside the panels 112. Referring to FIGS. 8, 11 and 18, the filter cartridge 46 preferably has four interconnected panels 112 to form a substantially rectangular or substantially square configuration when opened. The filter cartridge 46 may be folded between the panels 112 to be relatively flat compared to an unfolded condition, as shown in FIG. 18. One of ordinary skill in the art will recognize, in view of the present disclosure, that the filter cartridge 46 could have less than four or more than four interconnected panels 112. Preferably, as the filter cartridge 46 is capable of being folded relatively flat for compact packaging, shipping and storage and as such, would have an even number of panels 112. Alternative embodiments include the filter cartridge 46 having two panels 112 in a generally elliptical or oval configuration or three panels in a triangular configuration.

In the preferred embodiment, the filter cartridge 46 is disposable. The panels of the disposable filter cartridge 46 are preferably constructed of water permeable non-woven polyester fiber material. One of ordinary skill in the art will recognize that other permeable materials could be substituted, in view of the present disclosure. It is also preferred that each panel 112 contains filter media that may be impregnated in the panels 112 or located in pockets formed in the panels 112. In the present embodiment, the filter media are preferably a mixture of activated carbon and an organic scavenger resin. Alternatively, the filter media may only be an organic scavenger resin or only activated carbon. It is preferred that the resin is an anionic, cationic, nitrate-selective, ammonia-selective, and/or dissolved organic type material selective resin, and/or combinations thereof, all of which are well-known to those skilled in this technology. Bio-Chem Zorb® media (activated carbon, organic scavenger resins and ion-exchange resins) from Aquarium Pharmaceuticals, Inc., Chalfont, Pa., U.S.A., is an example of one preferred medium. One of ordinary skill in the art will recognize that the filter media could contain other materials capable of filtering water, in view of the present disclosure.

Alternatively, the filter cartridge can be a recleanable type, such as where the filter cartridge is a sponge or a foam. In one embodiment, the filter cartridge 44 is a foam having about 20 to about 30 pores per square inch (ppi). One of ordinary skill in the art would recognize in view of the present disclosure that the foam could be of any desired porosity so long as it is capable of filtering water.

After the water flows outwardly through the filter cartridge 46 of the removable filter cartridge caddy 44, it enters the filtered water section 50. The filtered aquarium water is preferably further treated with biological filter support media 142 to promote bio-filtration.

Referring to FIGS. 4A, 4B, 5A and 5B, the aquarium filter assembly includes a form of biological filter media 142 which are contained in a porous or partially open container 144. The biological filter media 142 includes massive colonies of nitrifying bacteria that rapidly develop a biological filter in both fresh water and saltwater aquariums. The bacteria occupy a porous polymer structure which allows for rapid transfer of oxygen and water. Bio-Chem Stars® (from Aquarium Pharmaceuticals, Inc., Chalfont, Pa., U.S.A.) is an example of one preferred medium. One of ordinary skill in the art would recognize that biological filtration could be accomplished in other ways, such as described below in an alternative embodiment.

The container 144 as shown in FIG. 5A is fitted with a slot 146a, 146b on each side so that it is capable of being slidingly secured within the filter assembly body 22 on the rib 148 that protrudes from the front 32 and back walls 34 and along the floor 40. The container 144 is constructed in a fashion in order to let water flow through the biological filter media 142. After the water is treated, it flows out of the filter assembly body 30 via the filter outlet 26, over the discharge lip 28 and thereby pours into the aquarium.

Referring to FIGS. 1-3, 4A and 4B, the aquarium filter assembly 20 includes a filter assembly cover 54 which covers the filtered water section 50 of the aquarium filter assembly 20. The filter assembly cover 54 also includes an opening 55 to accommodate the removable filter cartridge caddy 44. The filter assembly cover 54 preferably includes a dosing port 56 for conveniently inserting water treatment material such as medications, food, liquid nutrients and water conditioners without having to remove the assembly cover 54. The dosing port 56 includes a hole 150 that is of a size that allows the substance being introduced into the water to enter into the filtered water section 50 of the filter assembly body 30. The dosing port 56 may include a cover or a cap and either the dosing port 56 or the cap may contain lines or other indicia for measuring the volume of material to be added through the dosing port 56. Also the cap or cover would prevent dust and other debris from accumulating in the dosing port 56.

Figure 16:
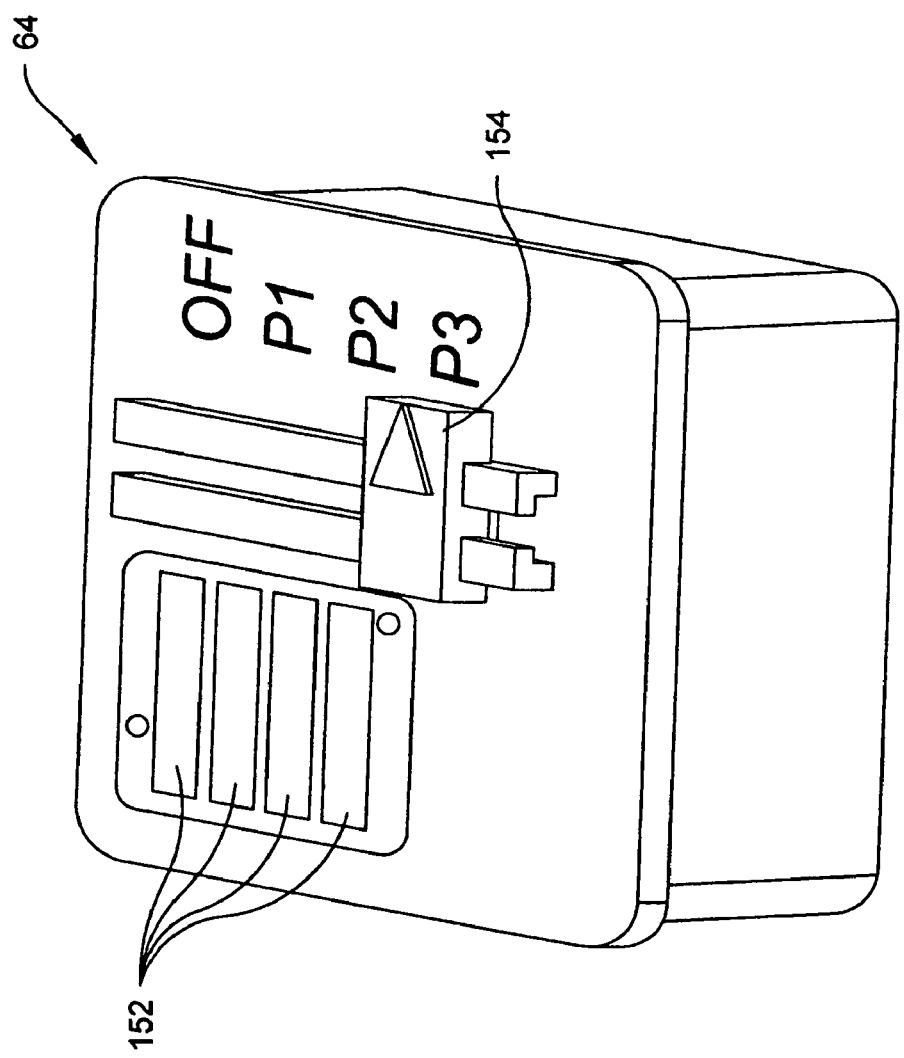
FIG. 16 is a top front perspective view of an optional timer which can be used with the aquarium filter assembly of the present invention.

As an option, the aquarium filter assembly 20 can include an indicator assembly 64 for filter replacement as shown best in FIGS. 1 and 16. The indicator assembly 64 is preferably an electronic timer indicating the time since the last filter cartridge 46 change or the time remaining until it is time to change the filter cartridge 46. The indicator assembly 64 includes indicator bars 152 that indicate the amount of time left before a scheduled filter replacement. As shown in FIG. 16, four bars are shown. For a detailed explanation of a suitable timer, see U.S. Pat. No. 6,224,751, the disclosure of which is hereby incorporated herein by reference in its entirety. An example would be to have one indicator bar 152 be displayed when a quarter of the time has elapsed, to have two indicator bars 152 be displayed when half of the time has elapsed, three indicator bars 152 indicating three quarters of the time has elapsed, and four indicator bars 152 to indicate that all of the time has elapsed and it is indeed time to change the filter cartridge 46. The same can be done in reverse (i.e., four bars indicating a fresh filter cartridge 46 and no bars indicating that it is time to change the filter cartridge 46). One skilled in the art would recognize that other options exist for indicating time such as using light emitting diodes (LEDs) as indication or warning lights in view of present disclosure. One color could signify a fresh filter cartridge 44, another color could signify that it is almost time to change the filter cartridge 44 and a third color could indicate that it is indeed time to change the filter cartridge 46. Optionally, an audible alarm or indicator could also be used instead of or in addition to the indicator bars 152 and/or LEDs. Another feature of the indicator assembly 64 is the load indication switch 154. The load indication switch 154 which is on the right hand side of the indicator assembly 64, as depicted in FIG. 16, operates on a capacitance basis with the electronics within the indicator assembly, and is slidingly moveable between four positions. Each position corresponds to a biological load level that could be present in the aquarium. The greater the biological load, the less time that would exist between filter cartridge 44 changes. Also, the indicator assembly 64 could easily be configured to automatically reset each time a filter cartridge 44 is changed, for example, by using magnetic reed switches or the like associated with the filter cartridge caddy 44 and the body 30 of the aquarium filter assembly 20. Preferably, the indication switch 154 has at least four positions, three of the positions indicating a program associated with the length of time between filter cartridge changes, and the last position would be used to turn off or reset the indicator assembly 64. It is also preferred that the indicator assembly 64 is powered by an external power source or, more preferably, a battery. Additionally, the indicator assembly 64 should be waterproof.

Figure 17:
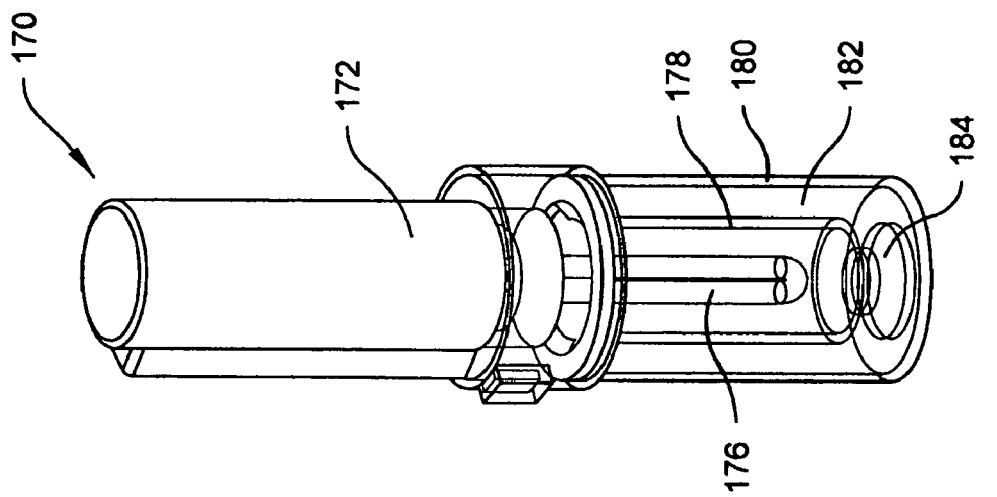
FIG. 17 is a side perspective view of an optional ultraviolet light assembly which can be used with the aquarium filter assembly of the present invention.

In an alternative embodiment, as depicted in FIGS. 12 and 13, the filter assembly 20 includes a pump 59 that pumps aquarium water though a manifold 68 into an opening 76 of the removable filter cartridge caddy 44 located in the filtered water section 50. The filter cartridge 46 is made of foam and/or activated carbon that is contained in a non-woven material, as described above, and performs mechanical and chemical filtration. Mechanically and chemically filtered water within the filtered water section 50 travels toward a biological filter 156. The biological filter 156 may comprise a caddy 157, similar to the removable filter cartridge caddy 44 described above, except having a peripheral support with grilles 158 containing small apertures. Filter media, preferably biological filter media 142, are contained within the caddy 157 for biological filtration. The biological filter medial 142 can be Bio-Chem Stars® media available from Aquarium Pharmaceuticals, Inc., or any other biological filter media known or to be known in the art. One of ordinary skill in the art would recognize that other filter media could be substituted in view of the present disclosure. Walls 160 extend from the grille 158 bordering the filtered water section 50 to form a division between the filtered water section 50 and a first chamber 162 which contains filtered and biologically treated water. Water enters through the grilles 158 bordering the first reservoir 150 and exits though the grilles 158 on the other sides of the biological filter 156 into the first chamber 164. The biological filter 156 further includes a plug 166 in the caddy 34 to block water from a manifold 68 from entering the biological filter 156 other than as described above. The biologically filtered water further travels from the first chamber 164 to a second chamber 168 where the water is optionally, but preferably, treated with UV radiation from a UV light assembly 170. A UV light assembly 170 is shown in FIG. 17 and is described in further detail below. The treated water then travels to the aquarium via an aquarium filter outlet 26.

In yet another embodiment, as seen in FIGS. 14 and 15, the filter assembly 20 includes two removable filter cartridge caddies 44, but otherwise operates as described above with respect to FIGS. 12 and 13. One of ordinary skill in the art would recognize in view of the present disclosure, that multiple mechanical and chemical filters and/or biological filters could be included in the aquarium filter assembly 20 so long as the mechanically filtered water is biologically filtered before returning to the aquarium.

The present invention optionally includes an ultraviolet (UV) light assembly 170 to sterilize or at least reduce some pathogens that may be present in the filtered aquarium water. Referring to FIG. 17, the UV light assembly 170 includes a housing 172 for storing electronic components 174 that are electrically connected to at least one UV light bulb 176. The UV light bulb 176 is enclosed by a closed-end inner tube 178 that is attached to the housing 172. The inner tube 178 is preferably made of a transparent material, such as quartz, that can withstand mechanical and thermal stresses without adversely affecting transmission of the UV light. The inner tube 178 is enclosed by an outer sleeve 180 that is attached to the housing 172, forming a space 182 between the inner tube 176 and the outer sleeve 180. The outer sleeve 180 includes an inlet 184 for the aquarium water to enter into the space 182. Furthermore, it is preferred that the UV light bulb 176 is powered by an external power source or a battery. The UV light assembly 170 could be used in any other type of aquarium filter or even directly in an aquarium, if desired.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An aquarium filter assembly comprising:
    a filter assembly body having a front wall, a back wall, left and right side walls and a floor, a water supply section and a filtered water section, each of the walls having an upper edge;
    the aquarium filter assembly being adapted for liquid connection with an aquarium,
    a removable filter cartridge caddy within the filter assembly body;
    the removable filter cartridge caddy having
        a base with an outer peripheral wall extending upwardly from the base and an inner peripheral wall extending upwardly from the base surrounding an opening in the base,
        a support for a filter cartridge,
        a lift handle,
        a removable cover connectable to an upper portion of the support;
    the filter cartridge removably supportable on the support, the filter cartridge including a plurality of panels comprising filter material,
        the filter cartridge panels being connected to form a space inside the plurality of panels;
    a removable filter assembly cover for the filter assembly that extends over the upper edges of the walls over the filtered water section, the cover having an opening for receiving the removable filter cartridge caddy, such that the removable filter cartridge caddy can be removed from the filter assembly without removing the filter assembly cover; and
    a water supply assembly within the water supply section to supply water from the aquarium to the filtered water section such that water flows from the water supply section through the filter cartridge supported by the caddy, into the filtered water section of the filter assembly body and then into the aquarium.

2. An aquarium filter assembly as in claim 1, wherein the support is a central support.

3. An aquarium filter assembly as in claim 2, further comprising a lift handle interlockingly connected to the upper portion of the support.

4. An aquarium filter assembly as in claim 2, wherein the support has an X-shaped horizontal cross-section with legs extending radially outwardly from the center toward corners of the base.

5. An aquarium filter assembly as in claim 1, wherein the support is a peripheral support.

6. An aquarium filter assembly as in claim 5, wherein the peripheral support is a frame with openings.

7. An aquarium filter assembly as in claim 1, wherein a boundary formed by outermost points of a horizontal cross-section of the support having at least three sides.

8. An aquarium filter assembly as in claim 1, wherein the filter cartridge has at least four interconnected panels such that the filter cartridge may be folded between the panels to be relatively flat compared to an unfolded condition.

9. An aquarium filter assembly as in claim 1, wherein the filter cartridge is disposable.

10. An aquarium filter assembly as in claim 9, wherein the panels are of a fabric material.

11. An aquarium filter assembly as in claim 10, wherein the fabric material is a permeable, non-woven polyester fiber material.

12. An aquarium filter assembly as in claim 1, wherein each panel contains filter media.

13. An aquarium filter assembly as in claim 12, wherein the filter media comprises activated carbon.

14. An aquarium filter assembly as in claim 12, wherein the filter media comprises an organic scavenger resin.

15. An aquarium filter assembly as in claim 14, wherein the resin is selected from a group consisting of anionic, cationic, nitrate-selective, ammonia-selective, dissolved organic material-selective resin and combinations thereof.

16. An aquarium filter assembly as in claim 12, wherein the filter media is a combination of activated carbon and organic scavenger resin.

17. An aquarium filter assembly as in claim 1, wherein the filter cartridge is cleanable and reusable.

18. An aquarium filter assembly as in claim 17, wherein the filter cartridge is a sponge.

19. An aquarium filter assembly as in claim 1, further comprising an indicator assembly for filter cartridge replacement.

20. An aquarium filter assembly as in claim 19, wherein the indicator assembly comprises an electronic timer indicating time to change the filter cartridge.

21. An aquarium filter assembly as in claim 20, wherein the timer is resettable manually.

22. An aquarium filter assembly as in claim 1, further comprising a motor driven pump operably connected in liquid communication with aquarium water and the caddy opening.

23. An aquarium filter assembly as in claim 1, further comprising a manifold between the filter assembly body floor and the caddy base;
    the manifold fluidly connected to the aquarium where water from the aquarium enters the manifold through an inlet in the water supply section and exits the manifold through an outlet to the caddy opening.

24. An aquarium filter assembly as in claim 23, further comprising a plurality of removable filter cartridge caddies,
    each removable filter cartridge caddy including a filter cartridge, and
    the manifold having an outlet to each removable filter cartridge caddy opening.

25. An aquarium filter assembly as in claim 1, further comprising the filtered water section within the filter assembly body, the filtered water section containing the removable filter cartridge caddy.

26. An aquarium filter assembly as in claim 25, further comprising a first chamber within the filter assembly body, the chamber fluidly connected to an aquarium, wherein the first chamber contains a receptacle for biological filter support media.

27. An aquarium filter assembly as in claim 26, wherein the first chamber is adjacent to the filtered water section to receive filtered water.

28. An aquarium filter assembly as in claim 27, comprising a second chamber in the aquarium filter body having an ultraviolet light.

29. An aquarium filter assembly as in claim 28, further comprising a filter assembly cover on the chambers.

30. An aquarium filter assembly as in claim 1, wherein the filter assembly cover further comprises a dosing port.

31. An aquarium filter assembly as in claim 1, further comprising an ultraviolet light.

32. An aquarium filter assembly as in claim 1, further comprising a water bypass area for water to bypass the filter cartridge if the filter cartridge is clogged.

33. A removable filter cartridge caddy for use in an aquarium filter comprising:
   a base with an outer peripheral wall extending upwardly from the base and an inner peripheral wall extending upwardly from the base and a tubular member surrounding an opening in the base,
   a support for a filter cartridge, wherein the filter cartridge comprises a plurality of interconnected panels comprising filter media,
      the support being a central support having an X-shaped horizontal cross-section with legs extending upwardly and radially from the center toward corners of the base,
   a lift handle connected to the removable filter cartridge caddy,
      the lift handle formed with an upper portion of the support, and
   a removable cover connectable to one of an upper portion of the support and an upper portion of the filter cartridge.

34. A removable filter cartridge caddy as in claim 33, further comprising a water bypass area for water to bypass the filter if the filter cartridge is clogged.

35. A removable filter cartridge caddy for use in an aquarium filter comprising:
   a base with an outer peripheral wall extending upwardly from the base and an inner peripheral wall extending upwardly from the base and a tubular member surrounding an opening in the base,
   a support for a filter cartridge,
      the support being one of a central support and a peripheral support,
   a lift handle connected to the removable filter cartridge caddy,
      the lift handle formed with an upper portion of the support, wherein the lift handle is interlockingly connected to the upper portion of the support using a locking meachanism; and
   a removable cover connectable to one of an upper portion of the support and an upper portion of the filter cartridge.

36. A removable filter cartridge caddy as in claim 35, wherein the locking mechanism comprises a male portion and a female portion; wherein
   the female portion comprises the upper portion of the support and comprises two opposing lips extending inwardly from a rim of the upper portion of the support; and
   the male portion comprises a cylindrical tube with the lift handle at a first end and two wedge shaped cams at a second end, back of the cams partly surrounding the cylindrical tube and having bearing surfaces that contact and bear against the lips when the lift handle is rotated in a first direction and is free of the lips when the left handle is rotated in an opposite direction.

37. A foldable filter cartridge for use in an aquarium,
   the filter cartridge including a plurality of panels with filter material,
   the filter cartridge having a folded condition such that the filter cartridge is relatively flat, and
   the filter cartridge panels being connected together along lateral edges in a polygonal shape other than a circle to form a space between opposing panels when in an open, operative condition such that the panels have only open opposing ends.

38. A filter cartridge as in claim 37, wherein the filter cartridge comprises four panels.

39. A filter cartridge as in claim 38, wherein the filter cartridge is disposable.

40. A filter cartridge as in claim 38, wherein the panels are of a fabric material.

41. A filter cartridge as in claim 40, wherein the fabric material is a permeable, non-woven polyester fiber material.

42. A filter cartridge as in claim 37, wherein each panel contains filter media within pockets formed in the panel.

43. A filter cartridge as in claim 37, wherein the filter media is activated carbon.

44. A filter cartridge as in claim 42, wherein the filter media is an organic scavenger resin.

45. A filter cartridge as in claim 44, wherein the resin is selected from a group consisting of anionic, cationic, nitrate-selective, ammonia-selective and dissolved organic material-selective resin.

46. A filter cartridge as in claim 42, wherein the filter media is a combination of activated carbon and organic scavenger resin.

47. A filter cartridge as in claim 37, wherein the filter cartridge is cleanable and reusable.

48. A filter cartridge as in claim 47, wherein the filter cartridge is a sponge.

* * * * *